Patented Apr. 20, 1948

2,440,092

UNITED STATES PATENT OFFICE 2,440,092

POLYMERS AND COPOLYMERS OF ALKOXY ACRYLIC ESTERS

Mark Hyman, Jr., and Paul H. Johnson, Jr., Cambridge, Mass., assignors to Polaroid Corporation, Cambridge, Mass., a corporation of Delaware No Drawing. Application October 17, 1945, Serial No. 622,948

2 Claims. (Cl. 260—78.3)

The present invention relates to synthetic resins and plastics and, more particularly, it relates to a process of producing resins from polymerizable compounds of alpha-alkoxy acrylates.

This application is a continuation-in-part of our copending application, Serial No. 503,108, filed on September 20, 1943, for Polymers and copolymers of alkoxy acrylic esters, now abandoned.

One object of the invention is to provide resins comprising compounds from the group consisting of ethyl alpha-ethoxy acrylate, cyclohexyl alpha-ethoxy acrylate, benzyl alpha-ethoxy acrylate, benzyl alpha-methoxy acrylate, and methyl alpha-ethoxy acrylate, which resins are useful in the formation of hard, transparent, optical elements possessing a relatively high index of refraction.

A further object is to provide novel copolymers formed from an alkoxy acrylate of the above-defined class and other unsaturated, polymerizable, methylene compounds.

Still another object is to provide a novel method of polymerizing the above-named alkoxy acrylates and their copolymers.

Other objects of the invention will in part be obvious and will in part appear hereinafter.

There is a pressing demand for a synthetic resin composition which may be used in the formation of optical elements such, for example, as lenses, prisms and the like, and which may preferably be cast or molded to the desired form. A preferred resin is one which may be cast into the desired form by, for example, polymerizing the monomer in a suitable mold or by advancing the polymerization of the partially polymerized material in a suitable mold. This invention contemplates the provision of new synthetic resins or plastics from a class of compounds which have heretofore been believed to be unpolymerizable, and polymers of which, when polymerized in accordance with the present invention, are particularly useful in the production of products of the character described. More specifically, this invention contemplates the provision of synthetic resins which, when polymerized, give a transparent, substantially colorless product having a relatively high index of refraction and which is suitable for use in the production of optical elements of the character described.

The compositions of the present invention comprise compounds from the class consisting of ethyl alpha-ethoxy acrylate, cyclohexyl alpha-ethoxy acrylate, benzyl alpha-ethoxy acrylate, benzyl alpha-methoxy acrylate, and methyl alpha-ethoxy acrylate, and to copolymers of compounds from the above class with other polymerizable, unsaturated, methylene compounds, and more particularly, a copolymer comprising 50%, by volume, of one of said alkoxy acrylates and 50% of methyl methacrylate.

The novel compositions of the present invention may be produced in the following manner, which is illustrative of one method of preparing cyclohexyl ethoxy acrylate: Pyruvic acid is esterified with cyclohexanol, as for example, by direct esterification, to obtain cyclohexyl pyruvate. To accomplish this, molar quantities of pyruvic acid and cyclohexanol are reacted, the water of esterification being removed during the reaction by a suitable water carrier, such as benzene. The esterification is carried out under vacuum, preferably such that the reaction temperature does not exceed 60° C., and preferably in the presence of a suitable esterification catalyst, such as p-toluene sulfonic acid. At the completion of the reaction, the reaction products are fractionally distilled to obtain the cyclohexyl pyruvate, the latter having a boiling point of 78 to 80° C. at 3 mm. of pressure. Molar quantities of cyclohexyl pyruvate and ethyl ortho-formate are then heated with a small amount of acetalization catalyst, such as hydrochloric acid or ammonium chloride, under a reduced pressure, as for example 100 mm. Ethyl formate is preferably removed from the reaction mixture during the reaction by being collected or condensed in a Dry Ice vacuum trap. The reaction mixture is then fractionally distilled, the acetal product, cyclohexyl alpha, alpha-diethoxy propionate being collected at 102° to 104° C. at 2 mm. of pressure. The cyclohexyl alpha, alpha-diethoxy propionate is then dealcoholated with a small amount of a catalyst, such as phosphorous pentoxide, the cyclohexyl alpha-ethoxy acrylate being thereafter distilled directly from the reaction mixture and collected at 93 to 95° C. at 2 mm. pressure. The monomeric material has a refractive index ($N_D^{20}$) of 1.4640.

It will be understood that monomers of the other compositions of the present invention may be synthesized in the above manner, as for example, ethyl alpha-ethoxy acrylate may be obtained by esterifying a suitable quantity of ethanol instead of cyclohexanol with the pyruvic acid as the first step of the synthesis. For the preparation of methoxy esters, methyl ortho-formate is used instead of ethyl ortho-formate.

Generally, the novel compounds of the present invention may be completely polymerized in from two days to two weeks by subjecting said compounds to the action of actinic light, such as ultra-violet light, preferably in combination with heat varying from about 70° to 80° C. while maintaining the compounds at atmospheric pressure and at a distance of about three inches from the source of ultra-violet light. Polymers or copolymers suitable for optical purposes are thus produced. Since the ultra-violet light acts as a polymerization catalyst, no additional catalyst need be added to the monomer to effect polymerization thereof. Heat alone will not polymerize these compounds completely either in the presence or absence of added polymerization catalysts. Prolonged exposure to a high intensity ultra-violet arc will not discolor the pure monomers or polymers. The polymer of cyclohexyl alpha-ethoxy acrylate is a hard, clear, transparent resin having an index of refraction ($N_D^{20}$) of 1.4969 and a nu value, or reciprocal dispersion, of approximately 59. The polymer of ethyl alpha-ethoxy acrylate is also a hard, clear, resin having an index of refraction of 1.4760 and a nu value, or reciprocal dispersion of 62.5. A good optical resin may also be obtained by copolymerizing equal quantities of the ethyl alpha-ethoxy acrylate and methyl methacrylate, the resulting resin having an index of refraction ($N_D^{20}$) of 1.4821 and a nu value, or reciprocal dispersion, of 59.5.

Methyl alpha-ethoxy acrylate can be copolymerized in equal proportions with methyl methacrylate monomer to give a hard, clear and transparent resin having an index of refraction ($N_D^{20}$) of 1.4737 and a nu value, or reciprocal dispersion, of 55.

The polymer of benzyl alpha-ethoxy acrylate is relatively hard and clear and has an index of refraction of 1.5518. It is also suitable for copolymerization with methyl methacrylate and other polymerizable, unsaturated methylene compounds to form a resin having good optical properties. The polymer of benzyl alpha-methoxy acrylate is hard, clear and transparent, and has an index of fraction ($N_D^{20}$) of 1.5586 and a nu value of approximately 39.

Under certain conditions, it may be preferable to provide a copolymer which has as one of its constituents one of the above-named acrylates and, as another constituent, a plastic which will suitably modify the properties of the resulting copolymer. This is especially true where a high index of refraction is not required.

It should be noted that alkoxy acrylates from the class consisting of ethyl alpha-ethoxy acrylate, cyclohexyl alpha-ethoxy acrylate, benzyl alpha-ethoxy acrylate, benzyl alpha-methoxy acrylate, and methyl alpha-ethoxy acrylate may satisfactorily be copolymerized under actinic light, such as ultra-violet light, with virtually all the polymerizable unsaturated methylene compounds to produce products having diverse and varied physical and optical properties. Suitable compounds for use in forming copolymers of the type described are methyl methacrylate, ethyl methacrylate, isopropyl methacrylate, ter-butyl methacrylate, cyclohexyl methacrylate, and other esters of alpha-methacrylic acid; the vinyl esters such as vinyl formate, vinyl acetate, vinyl propionate and the vinyl ester of chloracetic acid, etc., the vinyl ketones such as methyl vinyl ketone; styrene and vinyl naphthalene and derivatives thereof; and furylethylene. Other suitable materials for use in the formation of copolymers falling within the scope of this invention are the esters of itaconic acid and the esters of methylene malonic acid.

It is to be understood that the list of substances given is not all-inclusive although it is believed that the materials mentioned constitute the preferred substances for use in the present invention.

It is also to be understood that, if desired, hardening agents may be employed in small or substantial percentages. Any of a number of suitable hardening agents may be used. A preferred hardening agent for use with copolymers comprising methyl methacrylate is either methacrylic acid or acrylic acid although other known hardening agents such as methacrylic anhydride, divinyl benzene or allyl methacrylate may be used successfully.

While a preferred product is one which is transparent and which may be molded during polymerization into a suitable optical element, it is to be understood that products which are translucent or even opaque and hence useless in the formation of optical elements may be satisfactorily employed for other purposes where readily moldable, polymerized plastics are desirable, and such products comprising a material from the class consisting of alkoxy acrylates are to be deemed to fall within the scope of this invention.

Since certain changes may be made in the above product and different embodiments of the invention could be made without departing from the scope thereof, it is intended that all matter contained in the above description shall be interpreted as illustrative and not in a limiting sense.

It is also to be understood that the following claims are intended to cover all the generic and specific features of the invention herein described, and all statements of the scope of the invention which, as a matter of language, might be said to fall therebetween.

What is claimed is:
1. Cyclohexyl alpha-ethoxy acrylate.
2. A polymer of cyclohexyl alpha-ethoxy acrylate.

MARK HYMAN, Jr.
PAUL H. JOHNSON, Jr.

REFERENCES CITED

The following references are of record in the file of this patent:

UNITED STATES PATENTS

| Number | Name | Date |
|---|---|---|
| 1,980,483 | Hill | Nov. 13, 1934 |
| 2,326,736 | Adelson | Aug. 17, 1943 |

OTHER REFERENCES

Berichte, vol. 44, pages 3521-3524 (1911).
Beilstein, Handbuch der organische Chemie, 1929 edition, vol. 3, page 134.